(12) United States Patent
Chang et al.

(10) Patent No.: US 12,015,214 B2
(45) Date of Patent: Jun. 18, 2024

(54) ANTENNA STRUCTURE AND ELECTRONIC DEVICE

(71) Applicant: WISTRON NEWEB CORPORATION, Hsinchu (TW)

(72) Inventors: Chia-Hao Chang, Hsinchu (TW);
Chung-Che Lien, Hsinchu (TW);
Ting-Han Shih, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 154 days.

(21) Appl. No.: 18/045,840

(22) Filed: Oct. 12, 2022

(65) Prior Publication Data

US 2024/0030608 A1  Jan. 25, 2024

(30) Foreign Application Priority Data

Jul. 19, 2022 (TW) .................................. 111126939

(51) Int. Cl.
*H01Q 1/24* (2006.01)
*G01V 3/12* (2006.01)
(Continued)

(52) U.S. Cl.
CPC ............. *H01Q 9/0442* (2013.01); *G01V 3/12* (2013.01); *H01Q 1/2266* (2013.01); *H01Q 1/48* (2013.01); *H01Q 5/307* (2015.01); *H01Q 9/045* (2013.01)

(58) Field of Classification Search
CPC .......... G01V 3/12; H01Q 1/22; H01Q 1/2266; H01Q 1/24; H01Q 1/38; H01Q 1/48;
(Continued)

(56) References Cited

U.S. PATENT DOCUMENTS 7,525,490 B2 * 4/2009 Hung ...................... H01Q 5/371
343/702
7,535,421 B2 * 5/2009 Tseng ...................... H01Q 5/371
343/702
(Continued)

FOREIGN PATENT DOCUMENTS

TW 201624840 A 7/2016
TW 202143554 A 11/2021

*Primary Examiner* — Tho G Phan
(74) *Attorney, Agent, or Firm* — McClure, Qualey & Rodack, LLP (57) ABSTRACT

An antenna structure and an electronic device are provided. The antenna structure includes a substrate with opposing first and second surfaces, a first radiating element with a first radiating portion and a second radiating portion, a third radiating portion, a feeding portion, and a grounding portion that are connected to the first radiating portion, a second radiating element separate from but coupling with the first radiating portion, a grounding element connected to the grounding portion, and a feeding element. The first radiating portion, the feeding portion, and the grounding portion are disposed on the first surface. The second radiating portion and the third radiating portion are disposed on the second surface. A projected area of the second radiating portion onto the first surface partially overlaps with the feeding portion. A projected area of the third radiating portion onto the first surface partially overlaps with the grounding portion.

19 Claims, 5 Drawing Sheets

(51) Int. Cl.
*H01Q 1/22* (2006.01)
*H01Q 1/48* (2006.01)
*H01Q 5/307* (2015.01)
*H01Q 5/371* (2015.01)
*H01Q 9/04* (2006.01)

(58) Field of Classification Search
CPC  H01Q 5/30; H01Q 5/307; H01Q 5/31; H01Q 5/314; H01Q 5/32; H01Q 5/328; H01Q 5/33; H01Q 5/335; H01Q 5/37; H01Q 5/371; H01Q 5/378; H01Q 9/04; H01Q 9/0442; H01Q 9/045
See application file for complete search history.

(56) References Cited

U.S. PATENT DOCUMENTS

| | | | |
|---|---|---|---|
| 7,659,852 B2 * | 2/2010 | Hung | H01Q 9/0421 |
| | | | 343/702 |
| 9,472,847 B2 * | 10/2016 | Lee | H01Q 5/371 |
| 9,627,755 B2 | 4/2017 | Lin | |
| 9,929,463 B2 * | 3/2018 | Wu | H01Q 1/38 |
| 9,979,071 B2 * | 5/2018 | Hsieh | H01Q 1/38 |
| 11,923,597 B2 * | 3/2024 | Wu | H01Q 1/2266 |
| 2021/0351509 A1 | 11/2021 | Lin et al. | |

\* cited by examiner

ANTENNA STRUCTURE AND ELECTRONIC DEVICE

CROSS-REFERENCE TO RELATED PATENT APPLICATION

This application claims the benefit of priority to Taiwan Patent Application No. 111126939, filed on Jul. 19, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure and an electronic device having an operating frequency band used by the fifth generation mobile networks (5G).

BACKGROUND OF THE DISCLOSURE

Current electronic devices like tablet computers and laptop computers are designed to be thin and light. However, along with the development in 5G, the internal space of the electronic devices for antenna placement is insufficient, and so the antenna structure designed accordingly is deficient in bandwidth.

So, how to solve the aforementioned deficiency through improving the structural design of the antenna structure has become an issue to be overcome.

SUMMARY OF THE DISCLOSURE

In response to the above-referenced technical inadequacy, the present disclosure provides an antenna structure and an electronic device to solve the technical issue of an antenna structure deficient in bandwidth due to insufficient space for antenna placement in existing electronic devices.

In one aspect, the present disclosure provides an antenna structure, which includes a substrate, a first radiating element, a second radiating element, a grounding element, and a feeding element. The substrate has a first surface and a second surface opposing the second surface. The first radiating element is disposed on the substrate and includes a first radiating portion, a feeding portion, a second radiating portion, a grounding portion, and a third radiating portion. The first radiating portion is disposed on the first surface. The feeding portion is disposed on the first surface and connected to the first radiating portion. The second radiating portion is disposed on the second surface and connected to the first radiating portion, and a projected area of the second radiating portion projected onto the first surface partially overlaps the feeding portion. The grounding portion is disposed on the first surface and connected to the first radiating portion. The third radiating portion is disposed on the second surface and connected to the first radiating portion, and a projected area of the third radiating portion projected onto the first surface partially overlaps the grounding portion. The second radiating element is disposed on the substrate, and the second radiating element and the first radiating element are separate from each other but couple with each other. The feeding portion has a signal terminal connected to the feeding portion and a ground terminal connected to the grounding element.

In another aspect, the present disclosure provides an electronic device, which includes a housing and an antenna structure disposed in the housing. The antenna structure includes a substrate, a first radiating element, a second radiating element, a grounding element, and a feeding element. The substrate has a first surface and a second surface opposite the first surface. The first radiating element is disposed on the substrate and includes a first radiating portion, a second radiating portion, a third radiating portion, a feeding portion, and a grounding portion. The first radiating portion, the feeding portion, and the grounding portion are disposed on the first surface, and the feeding portion and the grounding portion are connected to the first radiating portion. The second radiating portion and the third radiating portion are disposed on the second surface and are connected to the first radiating portion. A projected area of the second radiating portion projected onto the first surface partially overlaps the feeding portion, and a projected area of the third radiating portion projected onto the first surface partially overlaps the grounding portion. The second radiating element is disposed on the substrate, and the second radiating element and the first radiating element are separate from each other and couple with each other. The grounding element is connected to the grounding portion. The feeding element has a signal terminal connected to the feeding portion and a ground terminal connected to the grounding element.

Therefore, through the designs of the second radiating element and the first radiating element being separate from each other and coupling with each other, the projected area of the second radiating portion onto the first surface partially overlapping the feeding portion, and the projected area of the third radiating portion onto the first surface partially overlapping the grounding portion in the antenna structure and the electronic device provided by the present disclosure, the bandwidth of the antenna structure in the electronic device is increased, and so the issue of conventional antenna structure having deficient bandwidth is solved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "or", as used herein, should include any one or a combination of the associated enlisted items, as the case may be. The term "connect" in the context of the present disclosure means there is a physical connection between two elements and is directly or indirectly connected. The term "couple" in the context of the present disclosure means there is no physical connection between two separated elements, and the two elements are instead connected by their electric field energy where the electric field energy generated by the current of one element excites the electric field energy of the other element.

Embodiment

Figure 1:
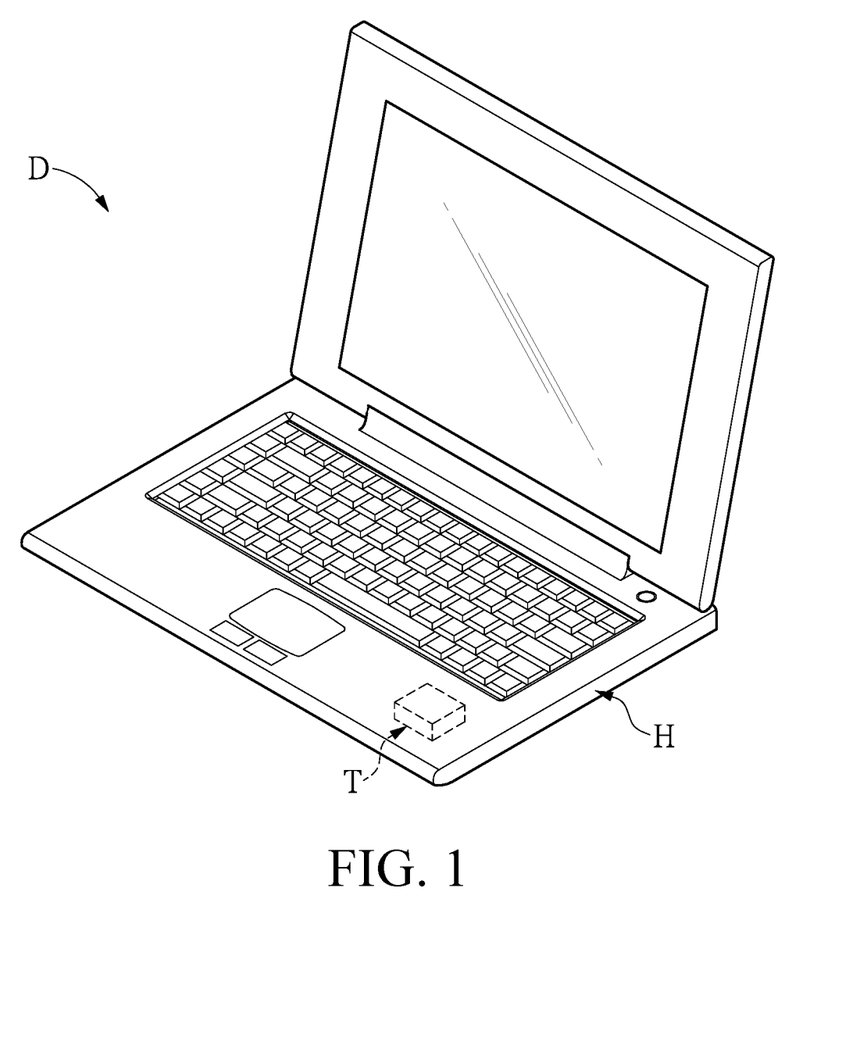
FIG. 1 is a perspective view of an electronic device of the present disclosure.
Figure 2:
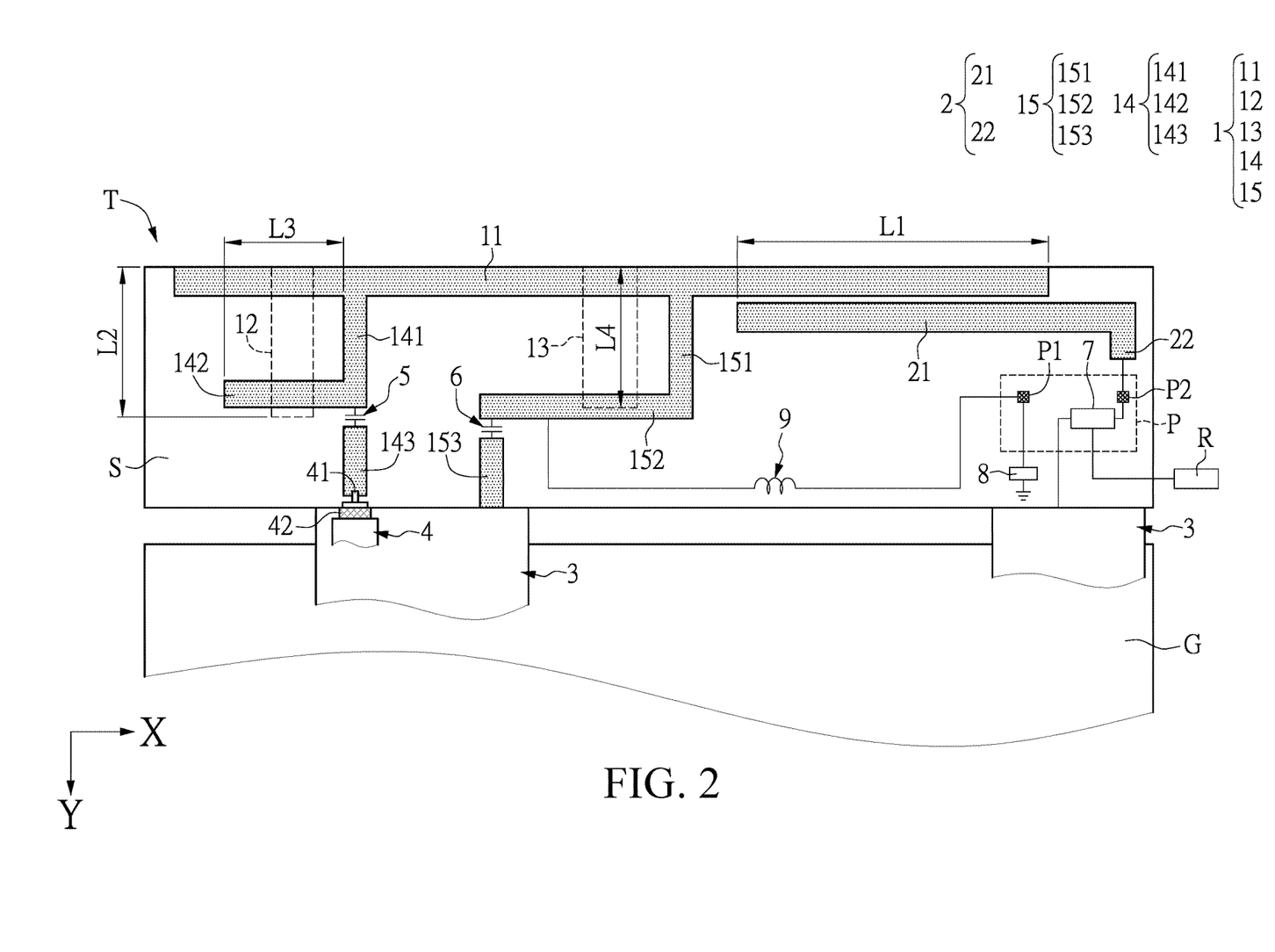
FIG. 2 is a schematic diagram of an antenna structure according to the present disclosure.

Referring to FIG. 1 and FIG. 2, the present disclosure provides an electronic device D with a housing H and an antenna structure T disposed in the housing H. The electronic device D is, for example, a laptop computer, but the present disclosure is not limited thereto. The antenna T provides, mainly, operating frequency bands with frequencies ranging between 617 MHz and 960 MHz, 1427 MHz and 2690 MHz, and 3000 MHz and 6000 MHz, respectively.

Figure 3:
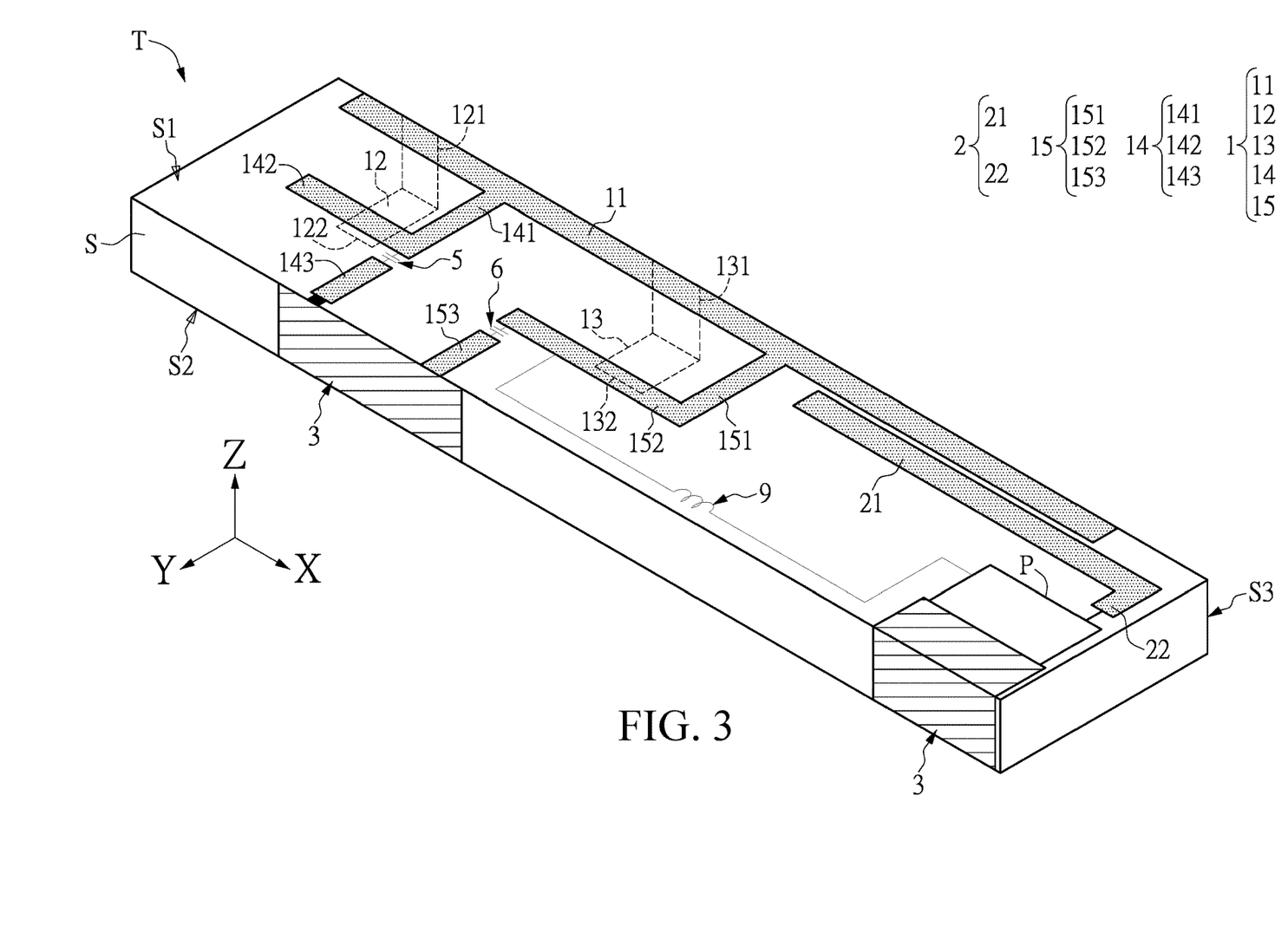
FIG. 3 is a perspective view of an antenna structure according to the present disclosure.

Referring to FIG. 2 and FIG. 3, the antenna structure T includes a substrate S, a first radiating element 1, a second radiating element 2, a grounding element 3, and a feeding element 4. The first radiating element 1, the second radiating element 2, the grounding element 3, and the feeding element 4 are disposed on the substrate S. For example, the substrate S is a flame retardant 4 (FR4) substrate, a printed circuit board (PCB), or a flexible printed circuit board (FPCB); the first radiating element 1, the second radiating element 2, and the grounding element 3 are in a form of a metal plate/sheet, a metal wire/cable, or other electrical conductive body; the feeding element 4 is a coaxial cable, but the present disclosure is not limited thereby.

The substrate S has a first surface S1, a second surface S2, and a third surface S3. The first surface S1 and the second surface S2 are on opposite sides of the substrate S, and the third surface 3 is in between and connects the first surface S1 and the second surface S2. The first radiating element 1 includes a first radiating portion 11, a second radiating portion 12, a third radiating portion 13, a feeding portion 14, and a grounding portion 15. The first radiating portion 11, the feeding portion 14, and the grounding portion 15 of the first radiating element 1 are disposed on the first surface S1, and the second radiating portion and the third radiating portion of the first radiating element 1 are disposed on the second surface S2. As shown in FIG. 3, the first ends 121, 131 of the second radiating portion 12 and the third radiating portion 13 are connected to the first radiating portion 11, and the second ends 122, 132 of the second radiating portion 12 and the third radiating portion 13 extend along the third surface S3 toward a negative Z-axis direction first and then turn and extend along the second surface S2 toward a positive Y-axis direction. It is to be noted that the aforementioned example is just one of the embodiments, and the present disclosure is not limited thereby. In other embodiments, the second radiating portion 12 and the third radiating portion 13 that are on the second surface S2 can also be electrically connected to the first radiating portion 11 on the first surface S1 through electrical via that penetrates the substrate S. Therefore, as shown in FIG. 2, a projected area of the second radiating portion 12 projected onto the first surface S1 partially overlaps the feeding portion 14, and a projected area of the third radiating portion 13 projected onto the first surface S1 partially overlaps the grounding portion 15.

The second radiating element 2 is disposed on the substrate S, and the present disclosure does not limit the position of the second radiating element 2 on the substrate S. The second radiating element 2 can be disposed on the first surface S1 or the second surface S2. In this embodiment, the second radiating element 2 is disposed on the first surface S1. In addition, the grounding element 3 is connected to the grounding portion 15. The grounding element 3 can be electrically connected to a metal piece G, and the metal piece G can be a part of the housing H of the electronic device D, but the present disclosure is not limited thereby. The feeding element 4 has a signal terminal 41 and a ground terminal 42. The signal terminal 41 is connected to the feeding portion 14, and the ground terminal is connected to the grounding element 3.

The feeding portion 14 includes a first section 141, a second section 142, and a third section 143. The first section 141 is connected to the first radiating portion 11. The third section 143 is connected to the feeding element 4. One end of the second section 142 is connected between the first section 141 and the third section 143. In specific, the projected area of the second radiating portion 12 projected onto the first surface S1 partially overlaps the second section 142 of the feeding portion 14. Moreover, the antenna structure T further includes a first capacitive element 5 that is electrically connected between the first section 141 and the third section 143, and the capacitance of the first capacitive element 5 is preferably 56 pF.

The grounding portion 15 includes a fourth section 151, a fifth section 152, and a sixth section 153. The fourth section 151 is connected to the first radiating portion 11. The sixth section 153 is connected to the grounding element 3. The fifth section 152 is connected between the fourth section 151 and the sixth section 153. In particular, the projected area of the third radiating portion 13 projected onto the first surface S1 partially overlaps the fifth section 152 of the grounding portion 15. Furthermore, the antenna structure includes a second capacitive element 6 that is electrically connected between the fifth section 152 and the sixth section 153, and the capacitance of the second capacitive element 6 is preferably 56 pF.

Referring to FIG. 2, the second radiating element 2 includes a first arm 21 and a second arm 22 connected to the first arm 21. The first arm 21 couples with the first radiating portion 11 to generate a first operating frequency band with a frequency range of 617 MHz to 916 MHz. The second radiating portion 12 couples with the second section 142 of the feeding portion 14 to generate a second operating frequency band having a frequency range between 4200 MHz and 5000 MHz, and the second operating frequency band is higher than the first operating frequency band. The third radiating portion 13 couples with the fifth section 152 of the grounding portion 15 to generate a third operating frequency band that is higher than the second operating frequency band and has a frequency range of 5000 MHz to 6000 MHz.

A coupling length L1 of the first arm 21 and the first radiating portion 11 is equal to one sixteenth (1/16) of a wavelength of a center frequency in the first operating frequency band. A coupling length L2 of the second radiating portion 12 and a coupling length L3 of the second section 142 are equal to one quarter (1/4) of a wavelength of a center frequency in the second operating frequency band. A coupling length L4 of the radiating portion 13 is equal to one quarter (1/4) of a wavelength of a center frequency in the third operating frequency band. It is to be noted that the term "coupling length" herein refers not to the length of the element, but to the effective length of the part of the element that in fact generates the coupling effect.

Since the feeding portion 14 and the grounding portion 15 are disposed on the first surface S1 of the substrate S and the second radiating portion 12 and the third radiating portion 13 are disposed on the second surface S2 of the substrate S, the coupling/amount of coupling between the second radiating portion 12 and the second section 142 and the coupling/amount of coupling between the third radiating portion 13 and the fifth section 152 are associated with the thickness of the substrate S, more specifically, the distance between the first surface S1 and the second surface S2. For the present disclosure, the thickness of the substrate S is less than 3 mm, and preferably is 1.5 mm.

Further, the antenna structure T includes a switch circuit 7, a proximity sensor circuit 8, and an inductive element 9. The switch circuit is electrically connected to the second arm 22. The inductive element 9 is connected in series between the fifth section 152 of the grounding portion 15 and the proximity sensor circuit 8. Preferably, the inductance of the inductive element 9 is 33 nH.

As shown in FIG. 2, the switch circuit 7 is one part of a multifunctional integrated module P. The first radiating element 1 is electrically connected to one pin P1 of the integrated module P through the grounding portion 15 and then electrically connected to the proximity sensor circuit 8 through the pin P1. Moreover, the second radiating element 2 is electrically connected to another pin P2 of the integrated module P through the second arm 22 and then electrically connected to the switch circuit 7 through the another pin P2.

Figure 4:
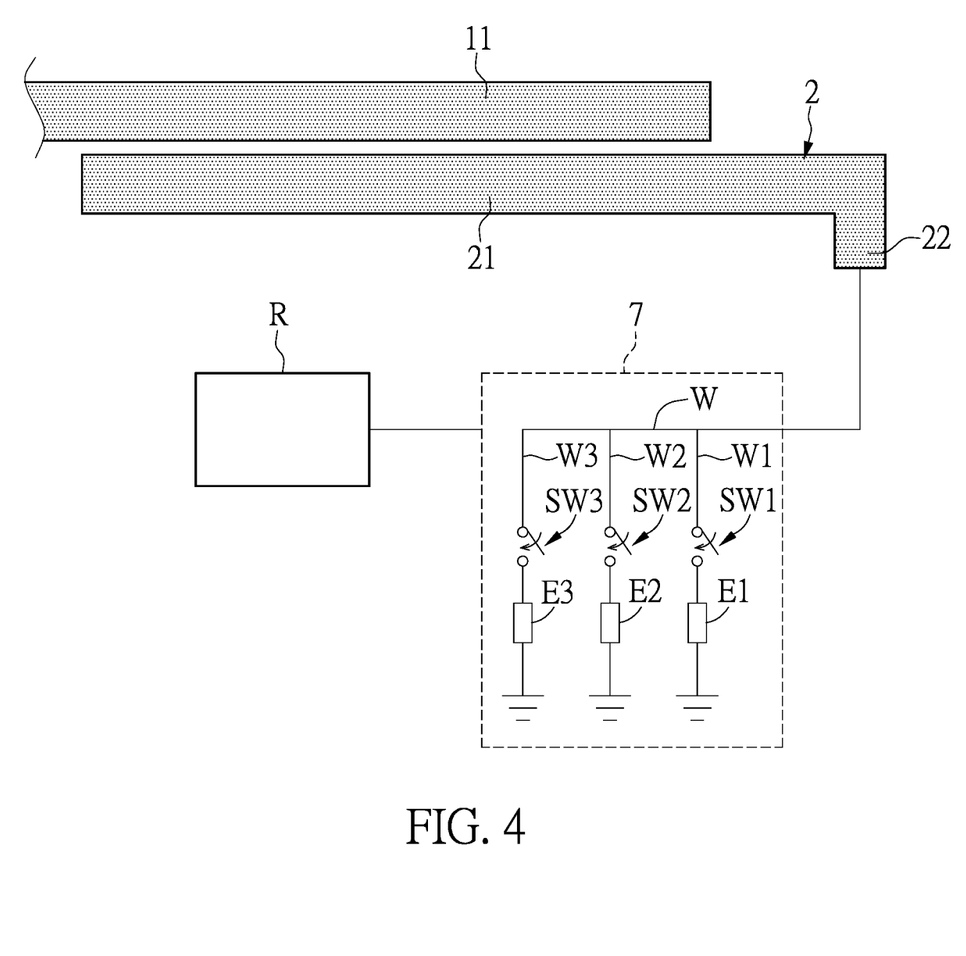
FIG. 4 is a schematic diagram illustrating a second radiating element and a switch circuit of an antenna structure according to the present disclosure.

Referring to FIG. 4, the switch circuit 7 includes a signal transmitting path W and at least one transmission path. The signal transmitting path W and the at least one transmission path respectively correspond to a plurality of operating modes. The signal transmitting path W is not connected in series with any passive element, and the at least one transmission path is respectively connected in series with at least one passive element. For example, in this embodiment, the at least one transmission path is a plurality of transmission paths, and the plurality of transmission paths are: a first path W1, a second path W2, and a third path W3 as shown in FIG. 4. One end of the signal transmitting path W is electrically connected to the second arm 22 of the second radiating element 2. The first path W1, the second path W2, and the third path W3 are electrically connected to the signal transmitting path W, and the present disclosure does not limit the number of transmission path. The first path W1 is connected in series with a first passive element E1 and a first switch SW1, the second path is connected in series with a second passive element E2 and a second switch SW2, and the third path W3 is connected in series with a third passive element E3 and a third switch SW3. According to the present disclosure, each of the first passive element E1, the second passive element E2, and the third passive element E3 can be an inductor, a capacitor, or a resistor, and the present disclosure is not limited thereby. In this embodiment, the first passive element E1, the second passive element E2, and the third passive element E3 are shown to be capacitors, and the capacitance of these three capacitors are 47 pF, 56 pF, and 68 pF, respectively. Thus, with the setup of the first passive element E1, the second passive element E2, and the third passive element E3, the electronic device D is able to adjust the operating frequency band, the impedance matching and/or the radiation efficiency of the antenna structure T.

As shown in FIG. 4, the switch circuit 7 includes four operating modes: a first mode, a second mode, a third mode, and a fourth mode. The electronic device D can further include a control circuit R. The control circuit R is configured to control the switch circuit 7 to switch to one of the plurality operating modes so as to adjust the operating frequency band of the antenna structure T. More specifically, the first mode is when the second radiating element 2 is electrically connected to the control circuit R while the first, second, and third switches SW1, SW2, SW3 located on the first, second and third paths W1, W2, W3 are in non-conducting state. The second mode is the second radiating element 2 being grounded through the first path W1, where the first switch SW1 of the first path W1 is in conducting state, and the second switch SW2 of the second path W2 as well as the third switch SW3 of the third path W3 are in non-conducting state. The third mode is where the second radiating element 2 is grounded through the second path W2 as the second switch SW2 located on the second path W2 is in conducting state while the first and third switches SW1, SW3 of the first and third paths W1, W3 are in non-conducting state. The fourth mode is to ground the second radiating element 2 through the third path W3. The third switch SW3 of the third path W3 is in conducting state, and the first switch SW1 and the second switch SW2 located respectively on the first path W1 and the second path W2 are in non-conducting state.

Figure 5:
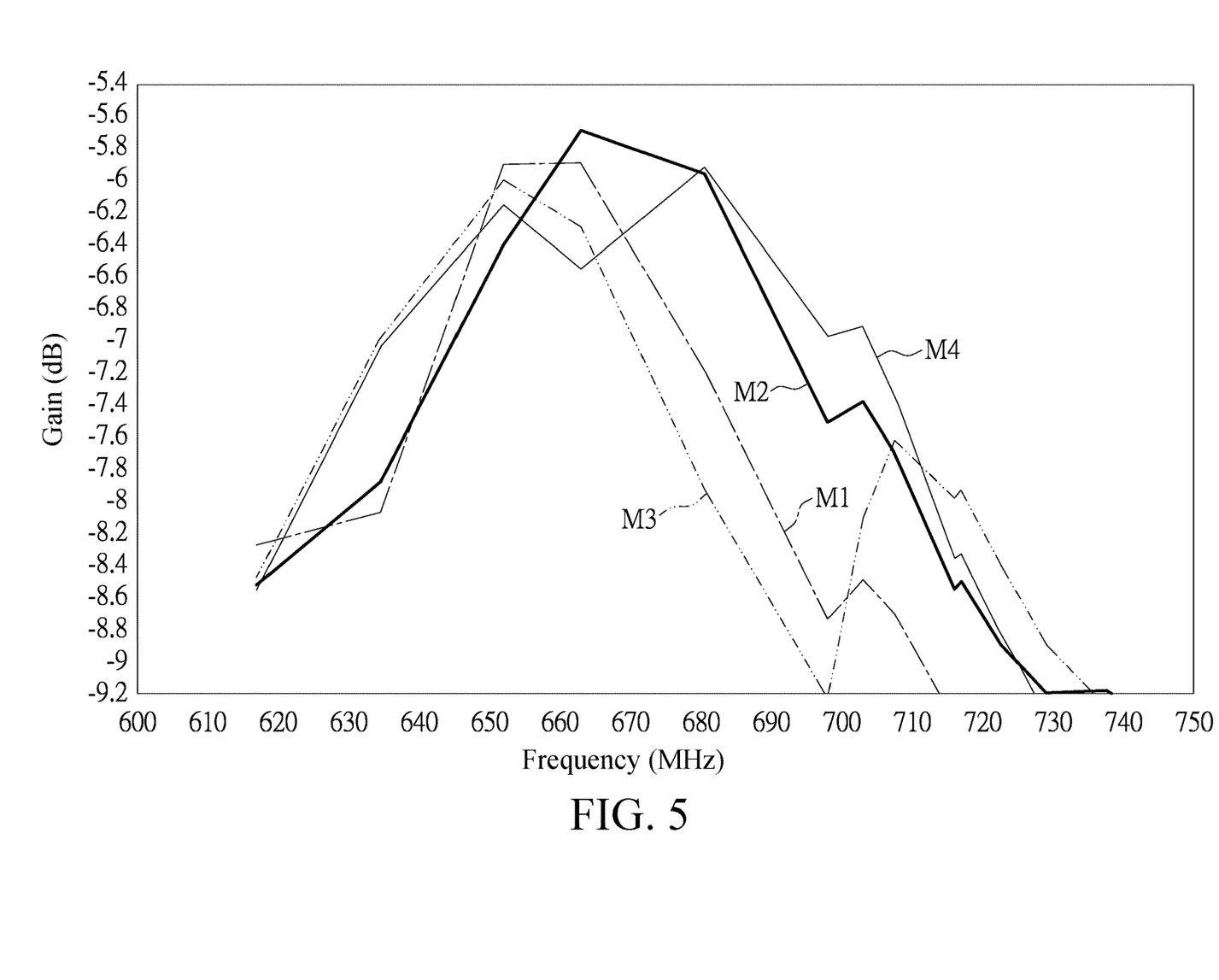
FIG. 5 is a gain chart illustrating curves representing an antenna structure according to the present disclosure in different operating modes.

FIG. 5 is the gain chart of the antenna structure operating in different modes, where curve M1 represents the gain of the electronic device D in the first mode, curve M2 represents the gain of the electronic device D in the second mode in which the first passive element E1 has a capacitance of 68 pF, curve M3 represents the gain of the electronic device in the third mode in which the capacitance of the second passive element E2 is 47 pF, and curve M4 represents the gain of the electronic device in the fourth mode in which the third passive element E3 has a capacitance of 56 pF. For example, when the switch circuit 7 is switched to a first mode, the operating frequency band generated by the antenna structure T has a first center frequency. When the switch circuit 7 switches to a second mode, the operating frequency band generated by the antenna structure T has a second center frequency. The first center frequency and the second center frequency are different from each other. Hence, through the switch circuit 7 switching between different transmission paths, namely the first path W1, the second path W2 and the third path W3, with different capacitances between 47 pF to 68 pF, the center frequency of the first operating frequency band is adjusted, and so the bandwidth of the first operating frequency band expands into the frequency range of 617 MHz to 698 MHz, thereby making the overall frequency range of the first operating frequency band to be from 617 MHz to 960 MHz.

Furthermore, through the placement of the proximity sensor circuit 8, the second radiating element 2 of the present disclosure is considered to be a sensor pad for detecting a distance between the antenna structure T and an object such as user's leg or other body part. As such, the electronic device D has the function of detecting whether a human body is near/approaching the antenna structure T and can adjust the radiation efficiency of the antenna structure T accordingly to avoid the issue of specific absorption rate (SAR) being too high.

Beneficial Effects of the Embodiments

In conclusion, through the design of the first arm 21 of the second radiating element 2 and the first radiating portion 11 being separate from each other and coupling together to form a first operating frequency band with a frequency range of 617 MHz to 916 MHz, in combination with the optimal design of the matching circuit composed by the first capacitive element 5, the second capacitive element 6, and the inductive element 9, and plus the switch circuit 7 in the integrated module P switching between different operating modes, the antenna bandwidth is increased and the antenna efficiency is enhanced, which in turn solves the problem of convention antenna structure having deficient bandwidth in the low frequency range.

More particularly, the present disclosure generates a second operating frequency with a frequency range of 4200 MHz to 5000 MHz through coupling the second radiating portion 12 with the second section 142 of the feeding portion 14 and, a third operating frequency with a frequency range of 5000 MHz to 6000 MHz by coupling the third radiating portion 13 with the fifth section 152 of the grounding portion 15. Furthermore, since the feeding portion 14 and the grounding portion 15 are disposed on the first surface S1 of the substrate S and, the second radiating portion 12 and the third radiating portion 13 are disposed on the second surface S2 of the substrate S, the present disclosure is able to achieve effective coupling and matching by adjusting the thickness of the substrate S.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:
a substrate having a first surface and a second surface, wherein the first surface and the second surface are on opposite sides of the substrate;
a radiating element disposed on the substrate and comprising:
a first radiating portion disposed on the first surface;
a feeding portion disposed on the first surface and connected to the first radiating portion;
a second radiating portion disposed on the second surface and connected to the first radiating portion, wherein a projected area of the second radiating portion projected onto the first surface partially overlaps the feeding portion;
a grounding portion disposed on the first surface and connected to the first radiating portion; and
a third radiating portion disposed on the second surface and connected to the first radiating portion, wherein a projected area of the third radiating portion projected onto the first surface partially overlaps the grounding portion;
a second radiating element disposed on the substrate, wherein the second radiating element and the first radiating portion are separate from each other but couple with each other;
a grounding element connected to the grounding portion; and
a feeding element having a signal terminal and a ground terminal, wherein the signal terminal is connected to the feeding portion, and the ground terminal is connected to the grounding element.

2. The antenna structure according to claim 1, wherein the feeding portion comprises a first section, a second section, and a third section, the first section is connected to the first radiating portion, the third section is connected to the feeding element, and one end of the second section is connected between the first section and the second section; wherein the projected area of the second radiating portion projected onto the first surface partially overlaps the second section.

3. The antenna structure according to claim 2, further comprising a first capacitive element electrically connected between the first section and the third section.

4. The antenna structure according to claim 2, wherein the grounding portion comprises a fourth section, a fifth section, and a sixth section, the fourth section is connected to the first radiating portion, the sixth section is connected to the grounding element, and the fifth section is connected between the fourth section and the sixth section; wherein the projected area of the third radiating portion projected onto the first surface partially overlaps the fifth section.

5. The antenna structure according to claim 4, further comprising a second capacitive element electrically connected between the fifth section and the sixth section.

6. The antenna structure according to claim 4, wherein the second radiating element comprises a first arm and a second arm connected to the first arm, the first arm couples with the first radiating portion to generate a first operating frequency band, and a coupling length of the first arm and the first radiating portion is equal to one sixteenth of a wavelength of a center frequency in the first operating frequency band.

7. The antenna structure according to claim 6, further comprising a switch circuit electrically connected to the second arm and having a plurality of operating modes, wherein the switch circuit is configured to adjust a bandwidth of the first operating frequency band through switching between different operating modes.

8. The antenna structure according to claim 7, wherein the switch circuit comprises a signal transmitting path and at least one transmission path electrically connected to the signal transmitting path, one end of the signal transmitting path is electrically connected to the second arm; wherein the signal transmitting path and the at least one transmission path respectively correspond to the plurality of operating modes, and the at least one transmission path respectively connects to at least one passive element; wherein the at least one passive element is a capacitor with a capacitance of 47 pF to 68 pF.

9. The antenna structure according to claim 6, wherein the second radiating portion and the second section of the feeding portion couple to generate a second operating frequency band that is higher than the first operating frequency band, and a coupling length of the second radiating portion is equal to one quarter of a wavelength of a center frequency in the second operating frequency band.

10. The antenna structure according to claim 9, wherein the third radiating portion and the fifth section of the grounding portion couple to generate a third operating frequency band that is higher than the second operating frequency band, and a coupling length of the third radiating portion is equal to one quarter of a wavelength of a center frequency in the third operating frequency band.

11. The antenna structure according to claim 1, further comprising a proximity sensor circuit and an inductive element, wherein the inductive element is connected in series between the grounding portion and the proximity sensor circuit.

12. An antenna structure, comprising:
a housing; and
an antenna structure disposed in the housing, the antenna structure comprising:
a substrate having a first surface and a second surface, wherein the first surface and the second surface are on opposing sides of the substrate;
a radiating element disposed on the substrate and comprising a first radiating portion, a second radiating portion, a third radiating portion, a feeding portion, and a grounding portion, wherein the first radiating portion, the feeding portion, and the grounding portion are disposed on the first surface, the second radiating portion and the third radiating portion are disposed on the second surface, the feeding portion, the grounding portion, the second radiating portion, and the third radiating portion are connected to the first radiating portion, a projected area of the second radiating portion projected onto the first surface partially overlaps the feeding portion, and a projected area of the third radiating portion projected onto the first surface partially overlaps the grounding portion;
a second radiating element disposed on the substrate, wherein the second radiating element and the first radiating element are separate from each other but couple with each other;
a grounding element connected to the grounding portion; and
a feeding element having a signal terminal and a ground terminal, wherein the signal terminal is connected to the feeding portion, and the ground terminal is connected to the grounding element.

13. The electronic device according to claim 12, wherein the feeding portion comprises a first section, a second section, and a third section, the first section is electrically connected to the first radiating portion, the third section is connected to the feeding element, and one end of the second section is electrically connected between the first section and the third section; wherein the projected area of the second radiating portion projected onto the first surface partially overlaps the second section.

14. The electronic device according to claim 13, further comprising a first capacitive element electrically connected between the first section and the third section.

15. The electronic device according to claim 13, wherein the grounding portion comprises a fourth section, a fifth section, and a sixth section, the fourth section is connected to the first radiating portion, the sixth section is connected to the grounding element, and the fifth section is connected between the fourth section and the sixth section; wherein the projected area of the third radiating portion projected onto the first surface partially overlaps the fifth section.

16. The electronic device according to claim 15, further comprising a second capacitive element electrically connected between the fifth section and the sixth section.

17. The electronic device according to claim 15, wherein the second radiating element comprises a first arm and a second arm connected to the first arm, the first arm and the first radiating portion couple to generate a first operating frequency band, and a coupling length of the first arm and the first radiating portion is one sixteenth of a wavelength of a center frequency in the first operating frequency band; wherein the second radiating portion and the feeding portion couple to generate a second operating frequency band that is higher than the first operating frequency band, and a coupling length of the second radiating portion and a coupling length of the feeding portion are one quarter of a center frequency in the second operating frequency band; wherein the third radiating portion and the grounding portion couple to generate a third operating frequency band that is higher than the second operating frequency band, and a coupling length of the third radiating portion is one quarter of a wavelength of a center frequency in the third operating frequency band.

18. The electronic device according to claim 17, further comprising a switch circuit and a control circuit, wherein the switch circuit is electrically connected to the second arm and has a plurality of operating modes, the switch circuit is configured to adjust a bandwidth of the first operating frequency band by switching between different operating modes, the switch circuit comprises a signal transmitting path and a plurality of transmission paths, one end of the signal transmitting path is electrically connected to the second arm, and the plurality of transmission paths are electrically connected to the signal transmitting path; wherein the signal transmitting path and the plurality of transmission paths respectively correspond to the plurality of operating modes, and the plurality of transmitting paths are respectively connected in series with a plurality of passive elements; wherein the plurality of passive elements are capacitors, and a capacitance of each of the capacitors ranges from 47 pF to 68 pF.

19. The electronic device according to claim 12, further comprising a proximity sensor circuit and an inductive element, wherein the inductive element is connected in series between the grounding portion and the proximity sensor circuit.

\* \* \* \* \*